US007836125B2

(12) United States Patent
Yoon et al.

(10) Patent No.: US 7,836,125 B2
(45) Date of Patent: Nov. 16, 2010

(54) SYSTEM AND METHOD FOR UPDATING MESSAGE DATA IN AN INTERACTIVE DISC PLAYER NETWORK

(75) Inventors: Woo Seong Yoon, Namyangloo-si (KR); Jea Yong Yoo, Seoul (KR); Tae Ho Kim, Seoul (KR); Soung Hyun Um, Kyungoi-do (KR); Limonov Alexandre, Seoul (KR)

(73) Assignee: LG Electronics Inc., Seoul (KR)

( * ) Notice: Subject to any disclaimer, the term of this patent is extended or adjusted under 35 U.S.C. 154(b) by 960 days.

(21) Appl. No.: 10/456,879

(22) Filed: Jun. 6, 2003

(65) Prior Publication Data

US 2004/0024818 A1 Feb. 5, 2004

(30) Foreign Application Priority Data

Jun. 7, 2002 (KR) ............ 10-2002-0031807

(51) Int. Cl.
*G06F 15/16* (2006.01)
(52) U.S. Cl. ............ 709/204; 709/227; 709/203; 715/758; 345/854
(58) Field of Classification Search ........ 709/227, 709/204; 715/758; 345/854
See application file for complete search history.

(56) References Cited

U.S. PATENT DOCUMENTS

| 6,557,041 B2 | 4/2003 | Mallart | |
| 6,727,916 B1 * | 4/2004 | Ballard | 715/758 |
| 6,785,834 B2 * | 8/2004 | Chefalas et al. | 714/4 |
| 7,100,191 B1 * | 8/2006 | Goldberg et al. | 725/110 |
| 7,171,613 B1 * | 1/2007 | Alexander et al. | 715/205 |
| 2001/0030667 A1 * | 10/2001 | Kelts | 345/854 |
| 2001/0034656 A1 * | 10/2001 | Lucas et al. | 705/26 |
| 2001/0052028 A1 | 12/2001 | Roberts et al. | |
| 2002/0078144 A1 * | 6/2002 | Lamkin et al. | 709/203 |
| 2003/0020671 A1 | 1/2003 | Santoro et al. | |
| 2003/0037110 A1 * | 2/2003 | Yamamoto | 709/204 |
| 2003/0229679 A1 | 12/2003 | Yoo et al. | |

FOREIGN PATENT DOCUMENTS

| CN | 1338692 | 3/2002 |
| JP | 11-098467 | 4/1999 |
| JP | 2002-123693 A | 4/2002 |
| KR | 2000-0030073 A | 6/2000 |
| KR | 2001-0000558 A | 1/2001 |
| KR | 10-2001-28563 A | 4/2001 |
| KR | 10-2002-7890 A | 1/2002 |
| KR | 10-2002-28438 A | 4/2002 |

(Continued)

*Primary Examiner*—Kyung-Hye Shin
(74) *Attorney, Agent, or Firm*—Birch, Stewart, Kolasch & Birch, LLP

(57) ABSTRACT

An interactive DVD system for reproducing chatting data is provided. The Content disk player is connected to a content server via a communication network. The Content disk player system comprises means for forwarding a request to the content server to receive new chatting data associated with content for play-back by the Content disk player, wherein the request comprises a first LUT information; means for receiving the new chatting data and a second LUT information associated with the new chatting data; means for playing back the new chatting data in synchronization with content provided from a content source.

6 Claims, 4 Drawing Sheets

| | FOREIGN PATENT DOCUMENTS | | | WO | WO-99/63524 A2 | 12/1999 |
|----|----|----|----|----|----|----|
| KR | 2003-0088731 A | 11/2003 | | WO | WO 00/63915 | 10/2000 |
| TW | 443569 Y | 6/2001 | | WO | WO-01/20468 A1 | 3/2001 |
| TW | 480857 B | 3/2002 | | WO | WO 01/31416 A2 | 5/2001 |
| TW | 485295 | 5/2002 | | WO | WO 03/096175 A1 | 11/2003 |
| TW | 529260 B | 4/2003 | | | | |

* cited by examiner

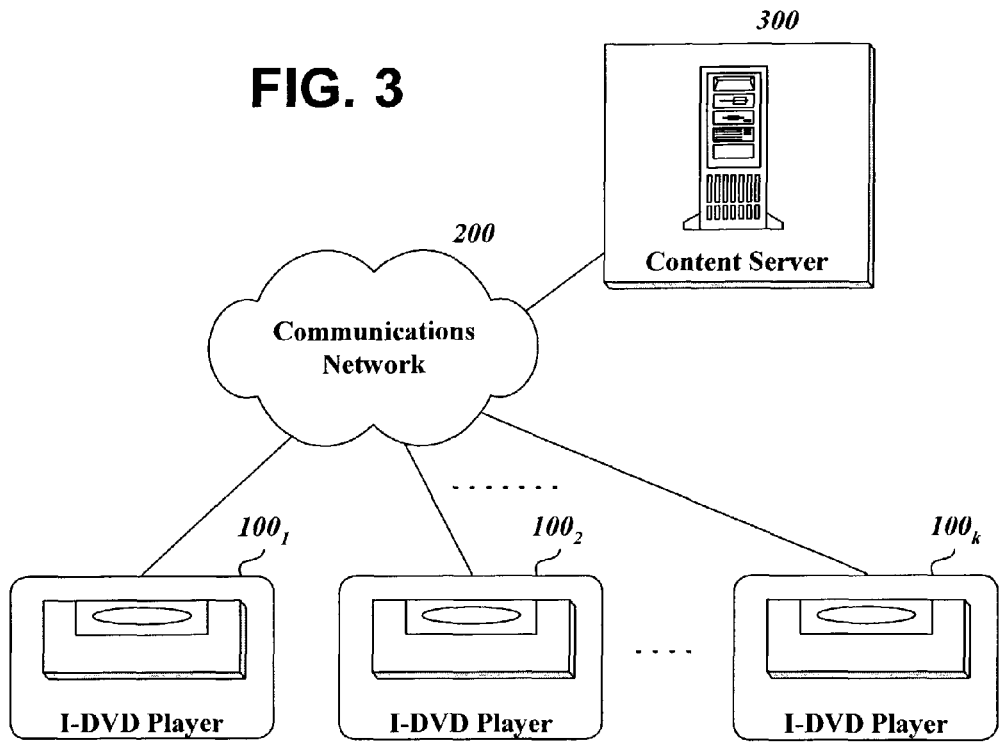
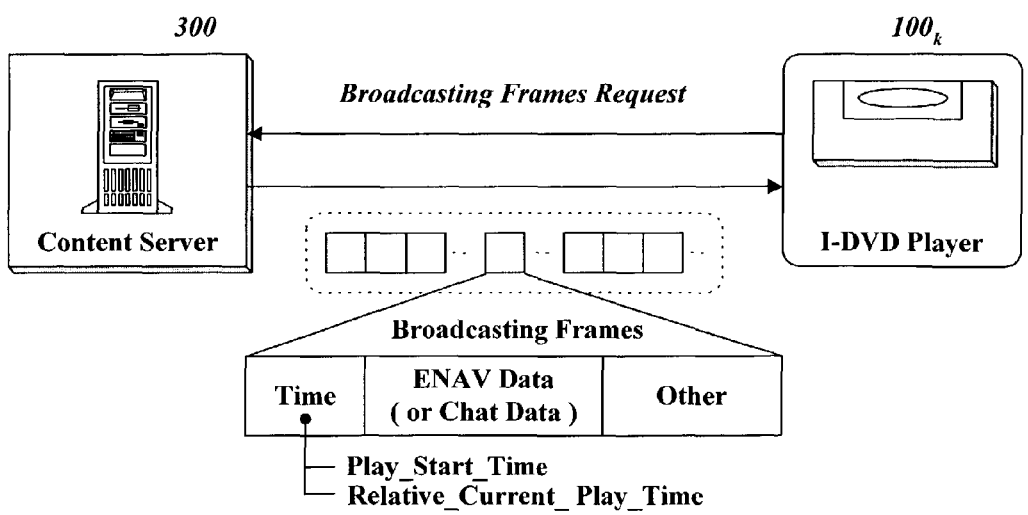

FIG. 5

*Message Base (Chatting Data)*

| Entry #1 | Message #1 (Chatting Data) | LUT #1 | TX_Player |
|---|---|---|---|
| Entry #2 | Message #2 (Chatting Data) | LUT #2 | TX_Player |
| Entry #3 | Message #3 (Chatting Data) | LUT #3 | TX_Player |
| Entry #4 | Message #4 (Chatting Data) | LUT #4 | TX_Player |
| Entry #5 | Message #5 (Chatting Data) | LUT #5 | TX_Player |
| Entry #6 | Message #6 (Chatting Data) | LUT #6 | TX_Player |
| ⋮ | ⋮ | ⋮ | ⋮ |
| Entry #k | Message #k (Chatting Data) | LUT #k | TX_Player |
| ⋮ | ⋮ | ⋮ | ⋮ |

FIG. 6

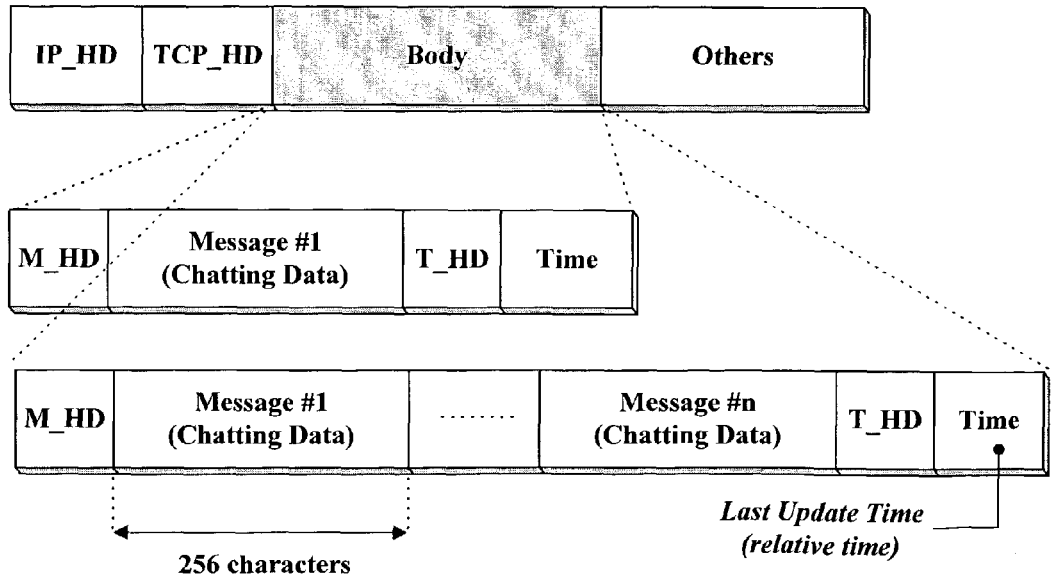

*Message Data Strem from Content Server*

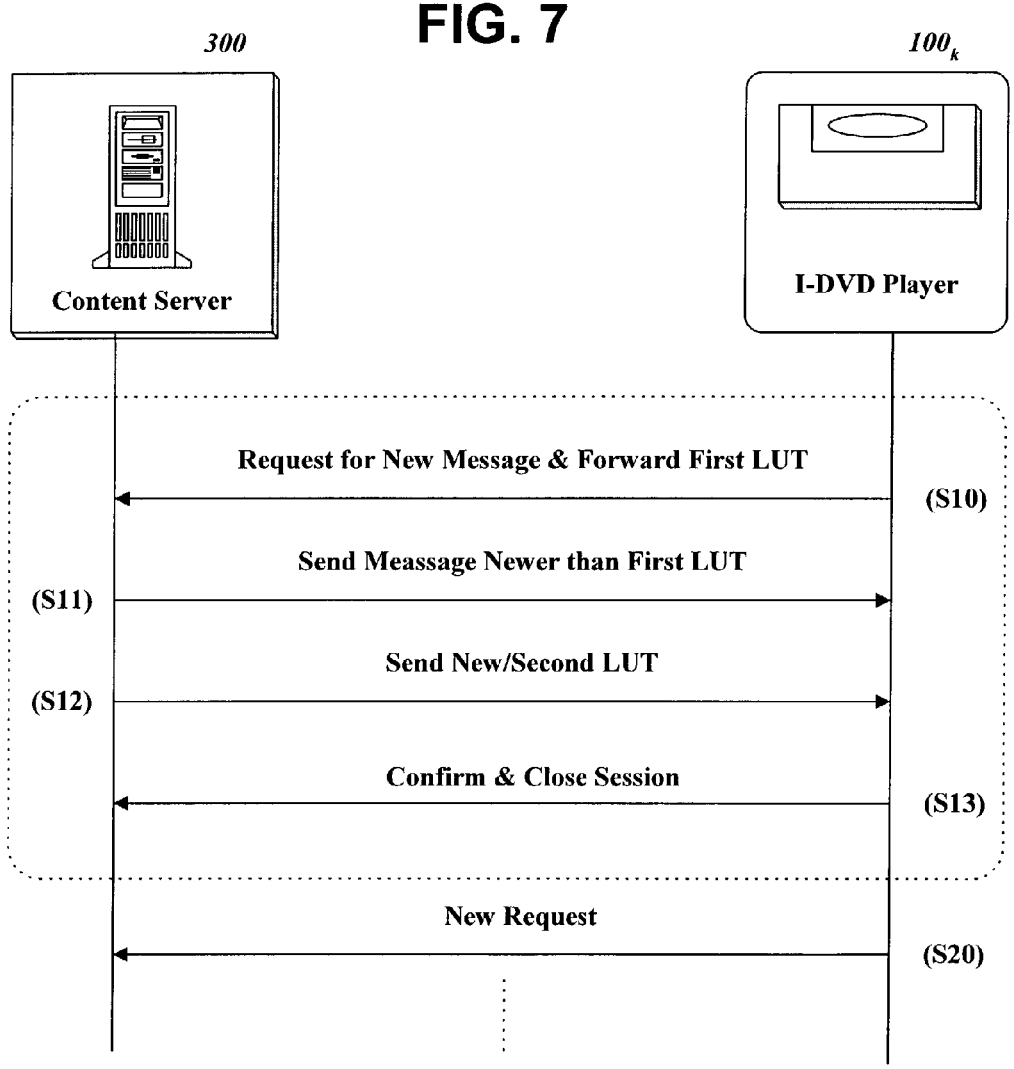

SYSTEM AND METHOD FOR UPDATING MESSAGE DATA IN AN INTERACTIVE DISC PLAYER NETWORK

CROSS-REFERENCE TO RELATED APPLICATION

Pursuant to 35 U.S.C. §119(a), this application claims the benefit of earlier filing date and right of priority to the Korean Patent Application No. 2002-31807, filed on Jun. 7, 2002, the content of which is hereby incorporated by reference in its entirety.

BACKGROUND OF THE INVENTION

1. Field of the Invention

The present invention relates to a method and system for reproducing content on an interactive disk network, and more particularly, to a method and system for reproduction of updated chatting content provided via interactive content disk players, such as an ENAV (Enhanced Navigation) or I-DVD (Interactive Digital Versatile Disk) players attached to a communication network.

2. Related Art

A high-density optical disk (e.g., a DVD) has very large storage capacity for digital data. The storage capacity of a DVD is sufficient to record high-quality motion picture data of relatively long duration as well as high-quality audio data.

A DVD has two recording areas, one for actual data (e.g., audiovisual or A/V data) and another for control or navigation data used for reproduction control of the recorded actual data. When a DVD is placed into a DVD player, the navigation data is read into a memory first, and then actual data (A/V data) is reproduced with reference to the instructions or control information included in the navigation data. As a result, a user can view a high quality motion picture stored on a DVD using a DVD player.

Recently, an interactive or enhanced navigation (i.e., "I-DVD" or "ENAV") system has been proposed. An interactive content medium, such as a content disk (e.g., I-DVD or ENAV disk) can comprise control, navigation or A/V data in form of 'html' (Hyper-Text Markup Language) or 'xml' (EXtensible Markup Language) files. The control data allows an interactive reproduction device (e.g., I-DVD or ENAV player) to reproduce A/V data in accordance with the control and navigation data stored on the interactive content disk or a content provider, such as a content server in communication with the navigation system through a network, such as the Internet. Furthermore, a user will be able to search the content of the disk in detail for particular information.

Throughout this document the terms "I-DVD" and "ENAV" are used interchangeably to refer to an interactive or enhanced navigation system. For simplicity and consistency, the term I-DVD will be used, hereinafter.

In order to transmit and receive chatting data and information between users, various software, such as communication protocol and supporting language for Internet chatting, and hardware, such as a large volume memory, are needed in the I-DVD player. This produces the problem of device enlargement. As such, a system and method is needed to overcome the above problems.

SUMMARY OF THE INVENTION

It is an object of the present invention to provide a method for optimizing chatting data and information exchange between various I-DVD users, who are connected to a content server. In accordance with one or more embodiments, a method of updating chatting data produced using an I-DVD player connected to a communication network comprise requesting to receive updated chatting data from a content server in communication with the I-DVD player through the communication network; and playing back the updated chatting data along with content information provided by at least one of the content server or an I-DVD disk.

The content information can be A/V data. At least some of the content information may be stored in the I-DVD disk. Alternatively, in one embodiment, at least some of the content information is stored on the content server. In some embodiments, last update time (LUT) information is transmitted to the content server when requesting to receive the updated chatting data. The LUT information indicates time when last updated chatting data, transmitted to the I-DVD player, was received by the content server.

In certain embodiments, new chatting data is transmitted to the I-DVD player from the content server, such that the chatting data are received by the content server after the LUT. The I-DVD player may request for the updated chatting data to be transmitted from the content server to the I-DVD player, such that the updated chatting data comprises chatting data provided to the content server subsequent to the LUT.

The I-DVD player may further receive new LUT information associated with the received new chatting data. In one embodiment, the LUT is measured relative to the playback starting time of the interactive optical disc. In certain embodiments, chatting data is transmitted from the content server to the I-DVD player at predetermined time intervals, for example.

In another embodiment, an interactive DVD (I-DVD) player system for reproducing chatting data, wherein the I-DVD player is connected to a content server via a communication network, comprises means for forwarding a request to the content server to receive new chatting data associated with content for play-back by the I-DVD player, wherein the request comprises a first LUT information; means for receiving the new chatting data and a second LUT information associated with the new chatting data; means for playing back the new chatting data along with content provided from a content source.

In some embodiments, the content source is the content server. In other embodiments, the content source is an I-DVD disk inserted in the I-DVD player. Sometimes, the second LUT information is stored in the I-DVD disk. Second LUT indicates time when the new updated chatting data was received by the content server from another I-DVD player.

In another embodiment, the first LUT indicates time when last chatting data transmitted to the I-DVD player was received by the content server from another I-DVD player. The new chatting data may be received from the content server at predetermined time intervals.

In yet another embodiment, a content server system for providing chatting data to at least one interactive DVD (I-DVD) player connected to a communication network comprises means for receiving a request from the I-DVD player for new chatting data, wherein the request comprises a first LUT information; and means for sending to the I-DVD player the new chatting data and a second LUT information associated with the new chatting data.

It is to be understood that both the foregoing general description and the following detailed description are exemplary and explanatory and are intended to provide a further explanation of the invention as claimed.

BRIEF DESCRIPTION OF THE DRAWINGS

The accompanying drawings, which are included to provide further understanding of the invention, illustrate the preferred embodiments of the invention, and together with the description, serve to explain the principles of the present invention.

FIG. 3 illustrates a block diagram of various I-DVD players and a content server connected in a communication network;

FIG. 4 illustrates a broadcasting frame communicated between an I-DVD and content servers, in accordance with one embodiment of the invention;

FIG. 5 illustrates chatting data that is recorded and managed in a database of a content server, in accordance with one embodiment of the invention;

FIG. 6 illustrates organization of message data stream that is transmitted from a content server, in accordance with one embodiment of the invention; and FIG. 7 is an exemplary illustration of chatting data transmission and reception process between an I-DVD player and content servers, in accordance with one embodiment of the invention.

Features, elements, and aspects of the invention that are referenced by the same numerals in different figures represent the same, equivalent, or similar features, elements, or aspects in accordance with one or more embodiments.

DETAILED DESCRIPTION OF THE PREFERRED EMBODIMENT

Figure 1:
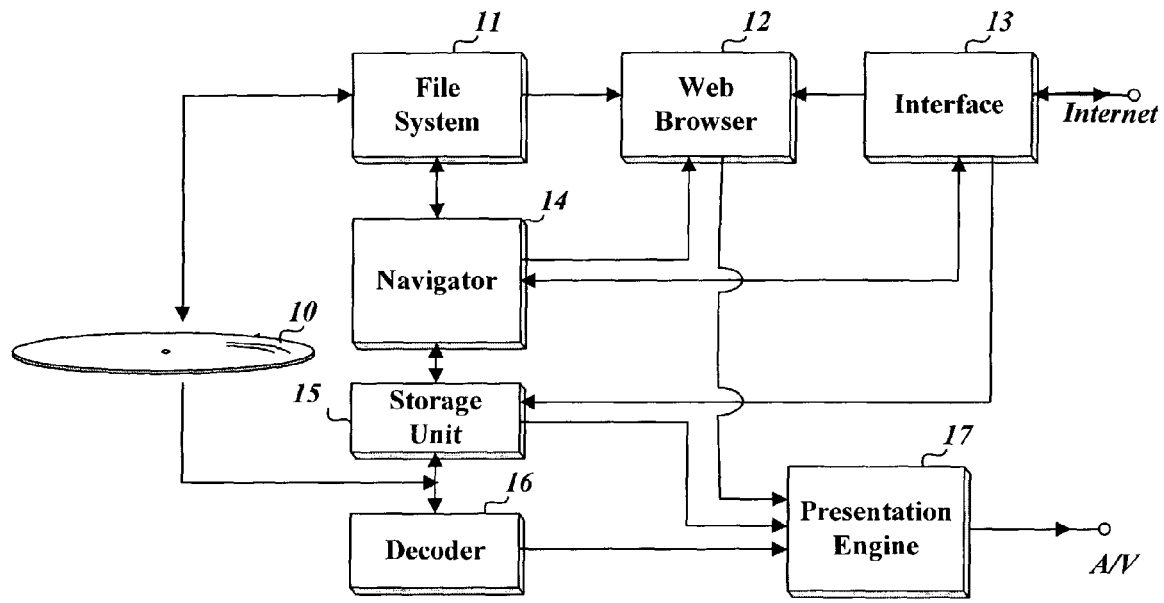
FIG. 1 illustrates a block diagram of an I-DVD player, in accordance with one embodiment of the invention.

Referring to FIG. 1, the system of the present invention, in accordance with one embodiment, is implemented to reproduce audiovisual (A/V) data stored on a content disk 10. A/V data may comprise DVD video data, image data, audio data, text, or other forms of information. The content disk 10 in addition to A/V data may contain enhanced navigation (ENAV) or control data to provide an interactive reproduction device (e.g., ENAV player or I-DVD player) with instruction on how to reproduce the A/V data or to provide additional information to be played with the A/V data. The terms ENAV or I-DVD are used interchangeably and refer to an interactive DVD system.

For the purpose of simplicity and efficiency, throughout the application, the system of the present invention has been described in association with an "I-DVD" disk or "IDVD" player. This association, however, is by way of example and should not be construed as limiting the invention to the particular embodiments disclosed. As such, alternative recording mediums or players are within the scope of the invention.

An I-DVD player, in accordance with one or more embodiments of the invention, comprises a DVD reproduction engine and an enhanced navigation or interactive (I-DVD) reproduction engine. The DVD reproduction engine is utilized in association with the I-DVD reproduction engine to reproduce A/V data stored on the I-DVD disk, in accordance with the enhanced navigation data stored on the I-DVD disk.

In some embodiments, the I-DVD engine of the system comprises a file system 11, a web browser 12, an interface 13, a navigator 14, a storage unit 15, a decoder 16, a presentation engine 17, and a controller (not shown). The web browser 12 and interface 13 provide network management services for connecting the I-DVD player to a communication network such as the Internet, and also to support enhanced user interface and to handle user interaction with the system. The file system 11 and navigator 14 act together to load, parse, and interpret digital data loaded from disk 10 for decoding purposes. The controller is utilized to process enhanced navigation data and the interface between the DVD engine and the I-DVD engine, and to control the system elements in response to a user request, for example.

The decoder 16 is utilized for decoding digital data read from disk 10, for example. The presentation engine 17 processes decoded A/V data to provide an A/V output to a display terminal, for example. File system 11 is provided for conducting file management (e.g., searching and reading recorded files, such as a disk information file, a setup file, and a sync data file), for example. Web browser 12 includes a web surfing function and is able to set up presentation environment for reproduction of A/V data, for example.

Storage unit 15 may be any type of data storage medium such as flash memory or a hard drive for storing files uploaded from disk 10 or files downloaded from a communication network to which the system is connected. Storage unit 15 can be cache memory or a buffer for temporary storage of information, for example, and may be implemented in RAM, ROM, EEPROM, a hard disk or other type of storage medium.

The navigator 14, the file system 11, and the web browser 12 represent logical units and may be implemented in form of software, hardware, or a combination of the two. In some embodiments, some or all of the logical units and components illustrated in FIG. 1 may be implemented in one or more integrated logic chips such as Field Programmable Gate Arrays (FPGAs) or Application Specific Integrated Circuits (ASICS)

Figure 2:
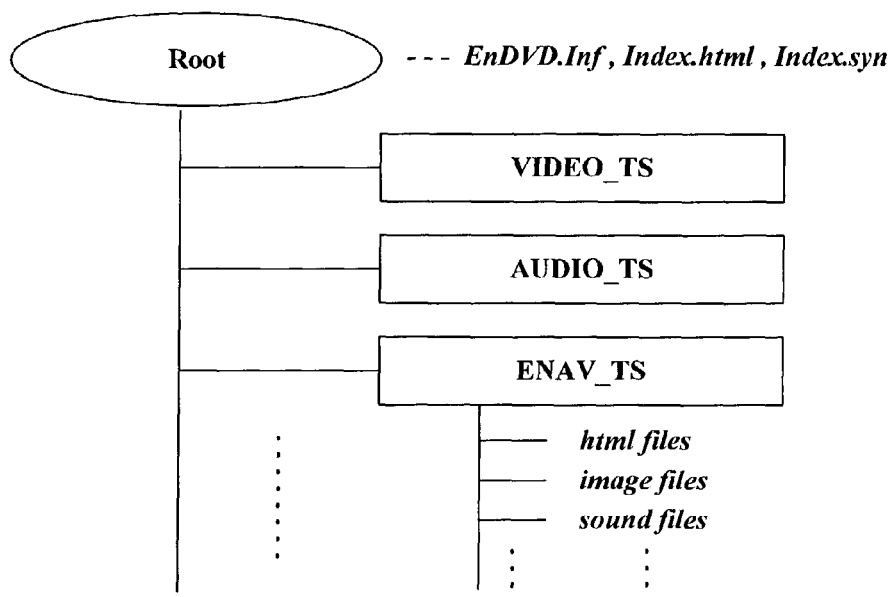
FIG. 2 is a rough illustration of directory structure of an I-DVD, in accordance with one embodiment of the invention.

Referring to FIG. 2, in accordance with one or more embodiments of the system, one or more data and/or control files exist or can be implemented under a root directory of the I-DVD disk. A DVD enhanced navigation directory (i.e., DVD_ENAV or ENV_TS) directory may exist, for example, directly under the root directory as shown in FIG. 2. Files including enhanced navigation or other control information and enhanced navigation content files may be placed under the DVD enhanced navigation directory. These files may include html, xml, and A/V content, for example.

In some embodiments, a first file 'EnDVD.Inf', for example, comprises information for reproduction of A/V data recorded on an I-DVD disk 10, a second file 'Index.html', for example, comprises information relating to initial setup for reproduction of A/V data, and a third file 'Index.syn', for example, comprises time information for synchronizing between A/V data and additional data provided through the communication network or a user.

In some embodiments, under the root directory, other subdirectories may be implemented. A directory 'VIDEO_TS', for example, may comprise files of video data. Another directory 'AUDIO_TS', for example, may comprise files of audio data, and a subsequent directory 'ENAV_TS', for example, may comprise additional content files (e.g., 'html' files, 'xml' files, image files, video and audio files).

In one embodiment, the file 'EnDVD.Inf', for example, under the root directory comprises information about a disk version, a content version, a content manufacturer, or a reference address (e.g., URL) for accessing a remote content provider. The remote content provider may provide a variety of contents and content-related information provided by other users connected to the same communication network or new update information that correspond with the A/V data being reproduced at a certain time interval.

The setup file 'Index.html', for example, under the root directory may comprise environment setup information for the web browser 12 and control or navigation information for reproduction of the content stored on I-DVD disk 10. The file 'Index.syn', for example, may comprise time stamp data to synchronize A/V data read from the I-DVD disk 10 with other contents down loaded from a remote content provider, for example.

In some embodiments, the directory 'ENAV_TS', for example, comprises additional contents to be reproduced or outputted in synchronization with A/V data. Additional contents provided from a remote content provider may be also stored under the directory 'ENAV_TS', for example. The additional contents may comprise html or xml files, image files, sound files, and video files, for example. It is noteworthy that the file and directory names and the particular data structures disclosed here with reference to the A/V and enhanced navigation data are for the purpose of example. As such, other names and different or equivalent directory structures and formats may be implemented or used that would accomplish the objectives of the present invention in the same manner to perform the same function and to obtain the same results, without limiting the scope of the invention.

Referring to FIG. 3, a content server 300 provides a service for enabling reception and verification of updated versions of content information associated with A/V data. For example, additional services, such as virtual theater, may allow various users located at remote locations to play the A/V data of the I-DVD simultaneously. Such services can provide identical content information to a number of I-DVD players $100_1$~$100_k$ that are connected to the content server 300 via the Internet, or another type of communication network.

The content server 300 allows various users, who are equipped with I-DVD players connected to the content server 300, to exchange various information among themselves by transmitting and receiving data (i.e., chatting data). Referring to FIG. 4, when a broadcasting frame request is received from the I-DVD player $100_k$, a time stamp that comprises play start time information (Play_Start_Time) of the I-DVD, or relative current playtime information (Relative_Current_Play_Time), and ENAV data of content information (or chat data, for example) are transmitted to the I-DVD player $100_k$.

The I-DVD player $100_k$ links and plays back the A/V data of the I-DVD 10 inserted in the apparatus, and content information or chatting data transmitted in the broadcasting frame, from the content server. Prior to playback, the I-DVD player searches and verifies playback starting time information (Play_Start_Time) in the broadcasting frame. In one embodiment, the I-DVD player searches and verifies relative current play time information from the timing information included in the broadcasting frame.

The I-DVD player $100_k$, after receiving the broadcasting frame, searches through a specific recording field of the I-DVD 10. I-DVD player $100_k$ performs a series of Internet multi-playback operations that link and play the A/V data from the searched recording field. Content information or chatting data transmitted via the broadcasting frame is also played back.

Referring to FIG. 5, chatting data is recorded and managed in database of content server 300. When the content server 300 receives chatting data, in form of a message, from various I-DVD players connected to the content server, the chatting data and the current receiving time information are associated with each other as the last updated time information (LUT) and are then stored and managed in a database. The chatting data message, includes index information (Tx_Player) of at least one I-DVD player, and can be stored and recorded as a single entry, for example.

The chatting data message that is recorded and managed as a single entry can be transmitted in a message data stream. In some embodiments, TCP/IP header information (IP_HD, TCP_HD) can be added, as illustrated in FIG. 6. The message data stream body comprises header information (M_HD), chatting data, time header information (T_HD) and the updated time information (e.g., LUT), for example.

In certain embodiments, the chatting data has a recording size that corresponds to a fixed number of letters. For example, in one embodiment, the chatting data has a recording size of about 256 letters. Various messages (message #1~#n) may be generated in sequence, and the update time information (LUT) can be appended to the end of the messages.

The update time information is transmitted along with the chatting data, in order to indicate the last time that the chatting data stored in an I-DVD player, which receives the chatting data message. In certain embodiments, to ensure nonoverlapping transmission of the already-received chatting data from the I-DVD player in the content server, the chatting message gets transmitted after being included in the message data stream.

The time information becomes the relative time information, which is counted to the point of time when the chatting data is provided either by setting the play start time (Play_Start_Time) of the I-DVD, or by setting the proper time that is being self-counted in the content server.

In one or more embodiments, when an I-DVD is inserted in the I-DVD player, the navigator 14 of the apparatus extracts 'index.html' file that is written under the root directory by controlling the operation of the file system 11. Then, the navigator 14 writes the extracted 'index.html' file into the storage device 15, such as a hard disk or a Flash Memory, and configures the necessary system environment for playing-back the I-DVD through an interface with a user, as well.

When a user requests Internet access, in one embodiment, the navigator 14 searches and extracts URL information of 'EnDvd.inf' file that is written under the root directory. Then, by driving and controlling the web browser 12 and the Internet interface 13, the access to the content server that corresponds to the URL information is established.

Thereafter, the navigator 14 transmits the disc version information, written in the 'EnDvd.inf' file, to the content server and requests transmission of the last updated setup file and the synchronization file that can be accommodated in the disc version to the content server.

In some embodiments, the content server searches and extracts, for example, 'index.html' file and 'index.syn' of the last updated contents version that is linked to the disc version and then transmits the files via the Internet. An I-DVD player at the receiving end reconfigures the system environment by using the last updated contents version, for example, 'index.html' file and 'index.syn' file that are transmitted from the content server.

According to a user request, the I-DVD player sets to Internet multi-play mode, for example, to process an Internet multi-play operation, in reference with FIG. 4. The I-DVD player requests and receives broadcasting frame through the interface with the content server 300, and requests transmission of the chatting data of the other users who are connected via the Internet (S10), for example.

In one embodiment, the I-DVD player requests transmission of last updated chatting data stored and managed in the content server 300, extracts last update time (LUT) of the chatting data transmitted to the I-DVD disk, and transmits said data to the content server 300 as illustrated in FIG. 7.

The content server 300 references the last updated time (LUT) information to search and extract new chatting data from a database. New chatting data is recorded in the data base after the time of the received LUT. The content server 300 transmits the updated chatting data via a message data stream, as illustrated in FIG. 7 (S11).

In some embodiments, the content server 300 transmits chatting data message with a recording size of about 256 letters, for example, to the I-DVD player. Also transmitted is time information that corresponds to the transmission time of the updated chatting data (S12).

In one embodiment, the I-DVD player $100_k$ transmits confirmation message (e.g., Confirm & Close Session), indicating correct reception of the chatting data and the time information received through the aforementioned processes, to the content server 300 (S13). The time information is updated and stored as the last update time (LUT) information of the chatting data most recently transmitted to and preferably recorded on the I-DVD player.

In certain embodiments, the updating process of the chatting data can occur at a predetermined time interval, for example, a time interval of every 30 seconds. The last updated time (LUT) information can be used to prevent redundant transmission of chatting data by tracking the exact time new data was forwarded to each I-DVD player in communication with the content server.

In one embodiment, the last update time (LUT) information does not include in the chatting data transmitted from an I-DVD disk of I-DVD player which requests transmission of last updated chatting data. In that case, the content server groups the chatting data that has been received and stored since the beginning of playback of an interactive optical disc, in sequence. The content server then transmits the grouped chatting data to the I-DVD disk player with a relative time information counted from the beginning of the interactive optical disk.

The relative time information is the time information that has been counted on the content server since an interactive optical disk started. An I-DVD player that has lost the last update time for the chatting data can request to receive the relative time information from the content server. Thus, the I-DVD player can use the relative time information as the last update time for the chatting data.

In one embodiment, if no new chatting data is produced or transmitted from an I-DVD player $100_k$, the content server 300 transmits an update message, for example, indicating that there are no new chatting data produced in a certain time interval. This enables a user of an I-DVD player to identify the data.

As such, a system and method for playing back updated chatting data in an I-DVD network is provided. While the invention has been disclosed with respect to a limited number of embodiments, those skilled in the art, having the benefit of this disclosure, will appreciate numerous modifications and variations therefrom. It is intended that the appended claims cover all such modifications and variations as fall within the true spirit and scope of the invention.

What is claimed is:

1. A method of reproducing updated message data in a content medium player connected to a content server via a communication network, the method comprising:
    playing back content stored on the content server and/or a recording medium provided to the content medium player along with message data transmitted from the content server, the step of playing including
        sending a request along with last update time (LUT) information to the content server to transmit updated message data received from another content medium player,
    wherein the LUT information indicates a time when last updated message data from the another content medium player, received by the first content medium player, was originally received by the content server, and
    wherein the LUT is measured relative to the playback starting time of the recording medium; and
    receiving, from the content server, new message data sent from said another content medium player, the new message data being received by the content server after the time when the last updated message data from the second content medium player was originally received by the content server, the step of receiving including receiving new LUT information associated with the received new message data.

2. The method of claim 1, wherein the content is A/V data.

3. The method of claim 1, wherein said content is audio-visual data and said content medium player is an interactive-DVD (I-DVD).

4. A first interactive content medium player device for reproducing message data, comprising:
    a storage device configured to store instructions for controlling the first interactive content medium player device;
    an interface device connected to a communication network;
    a presentation device; and
    a control device,
    wherein if the instructions are executed, the instructions cause
        the interface device to communicate with a second interactive content medium player via a content server;
        the presentation device to play back content stored on the content server and/or a recording medium provided to a content medium player along with message data transmitted from the content server; and
        the control device to control the presentation device and the interface device to exchange message data between the first content medium player and the second content medium player via the content server, while playing back the content,
    wherein, according to the instructions, the control device is configured to control the interface device to send a request along with last update time (LUT) information to the content server to receive transmit updated message data from the second content medium player,
    wherein the LUT information indicates a time when last updated message data from the second content medium player, received by the first content medium player, was originally received by the content server,
    wherein said LUT is measured relative to the playback starting time of the recording medium, and
    wherein, according to the instructions, the control device is configured to control the interface device to receive from the content server new message data sent from the second content medium player and new LUT information associated with the received new message data, the new message data being received by the content server after the time when the last updated message data from the second content medium player was originally received by the content server.

5. The device of claim 4, wherein the content is A/V data.

6. The device of claim 4, further comprising:
a database configured to store the updated message data.

* * * * *